(12) United States Patent
Fukase et al.

(10) Patent No.: US 9,479,029 B2
(45) Date of Patent: Oct. 25, 2016

(54) ELECTRIC ROTATING MACHINE

(75) Inventors: Tatsuya Fukase, Chiyoda-ku (JP);
Hitoshi Isoda, Chiyoda-ku (JP);
Naohide Maeda, Chiyoda-ku (JP);
Masahiko Fujita, Chiyoda-ku (JP); Dai Nakajima, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 560 days.

(21) Appl. No.: 14/004,198

(22) PCT Filed: Jun. 7, 2011

(86) PCT No.: PCT/JP2011/063027
§ 371 (c)(1),
(2), (4) Date: Sep. 10, 2013

(87) PCT Pub. No.: WO2012/169007
PCT Pub. Date: Dec. 13, 2012

(65) Prior Publication Data
US 2014/0001915 A1    Jan. 2, 2014

(51) Int. Cl.
*H02K 9/28* (2006.01)
*H02K 5/14* (2006.01)
*H02K 5/22* (2006.01)
(Continued)

(52) U.S. Cl.
CPC ............ *H02K 9/28* (2013.01); *H01R 39/38* (2013.01); *H02K 5/141* (2013.01); *H02K 5/225* (2013.01); *H02K 19/365* (2013.01)

(58) Field of Classification Search
CPC ........ H02K 9/28; H02K 5/141; H02K 5/225; H02K 19/365; H01R 39/38
See application file for complete search history.

(56) References Cited

U.S. PATENT DOCUMENTS 4,859,894 A * 8/1989 Akutsu ................. H01R 39/38
310/239
4,959,576 A * 9/1990 Horibe .................. H02K 5/141
310/232

(Continued)

FOREIGN PATENT DOCUMENTS

CN    1441534 A    9/2003
JP    05-199701 A    8/1993

(Continued)

OTHER PUBLICATIONS

Communication dated Nov. 6, 2015 from the European Patent Office in counterpart application No. 11867230.2.

(Continued)

*Primary Examiner* — Dang Le
(74) *Attorney, Agent, or Firm* — Sughrue Mion, PLLC; Richard C Turner

(57) ABSTRACT

An electric rotating machine is provided that efficiently radiates heat, caused in the vicinity of a portion where a brush and a slip ring makes contact with each other, to the outside of a brush holder and that can prevent the temperature of the brush from excessively rising. The brush holder holding the brush that supplies a magnetic-field current to a magnetic-field winding by way of the slip ring is provided with an energization terminal that electrically connects a magnetic-field circuit with the brush and a brush cooling metal member that cools the brush; the brush cooling metal member radiates heat, generated in the vicinity of a contact portion between the brush and the slip ring, to the outside of the brush holder.

20 Claims, 10 Drawing Sheets

(51) Int. Cl.
H02K 19/36 (2006.01)
H01R 39/38 (2006.01)

(56) References Cited

U.S. PATENT DOCUMENTS

| | | | | |
|---|---|---|---|---|
| 5,424,600 | A * | 6/1995 | Ishikawa | H02K 5/136 310/220 |
| 5,949,175 | A * | 9/1999 | Cummins | H01R 39/38 310/239 |
| 6,229,242 | B1 * | 5/2001 | Autret | H01R 39/38 310/239 |
| 2002/0047470 | A1 | 4/2002 | Shioya et al. | |
| 2003/0111929 | A1 * | 6/2003 | Hong | H02K 5/148 310/239 |
| 2003/0160534 | A1 | 8/2003 | Tsuge et al. | |
| 2009/0189478 | A1 | 7/2009 | Wada et al. | |
| 2010/0289351 | A1 | 11/2010 | Maeda et al. | |
| 2013/0334935 | A1 * | 12/2013 | Godefroy | H02K 9/28 310/68 B |

FOREIGN PATENT DOCUMENTS

| | | |
|---|---|---|
| JP | 2002-240771 A | 8/2002 |
| JP | 2003-047207 A | 2/2003 |
| JP | 2008-236979 A | 10/2008 |
| JP | 2009-177993 A | 8/2009 |
| JP | 2010-268541 A | 11/2010 |
| JP | 2010268541 A | 11/2010 |

OTHER PUBLICATIONS

Webster; "Heat Sink Definition", Dec. 18, 2009, Retrieved from the Internet; URL;https://web.archive.org/web/20091218020942/http://www.yourdictionary.com/heat-sink [retrieved on Oct. 27, 2015].

Communication dated Mar. 30, 2015 from the State Intellectual Property Office of the People's Republic of China in counterpart application No. 201180069822.X.

Japanese Office Action issued Apr. 15, 2014, Patent Application No. 2013-519258.

\* cited by examiner

US 9,479,029 B2

ELECTRIC ROTATING MACHINE

CROSS REFERENCE TO RELATED APPLICATIONS

This application is a National Stage of International Application No. PCT/JP2011/063027 filed Jun. 7, 2011, the contents of all of which are incorporated herein by reference in their entirety.

TECHNICAL FIELD

The present invention relates to an electric rotating machine and more particularly to a brush-holder structure in which temperature rise in a brush and a brush holder is prevented.

BACKGROUND ART

To date, for example, in a magnetic-field-winding electric rotating machine for a vehicle, a magnetic-field current is supplied from the brush to the magnetic-field winding of the rotor by way of the slip ring. In this situation, the brush slides being pressed by a spring mounted at the rear portion of the brush. Due to an electric loss and sliding friction in the sliding unit and respective electric losses in the energization paths thereof, heat is generated in the brush and the slip ring. The slip rings in pairs are provided separately at the positive side and the negative side; the brushes in pairs are provided separately at the positive side and the negative side. In general, the brushes and the slip rings are held in such a way as to be covered with an insulative resin for securing the electric insulation between the positive side and the negative side.

A labyrinth structure that prevents intrusion of external foreign materials and moisture and has a function of exhausting brush abrasion powder is provided between a brush holder containing the brushes and a slip-ring molding resin. A small gap is provided in the labyrinth structure; however, cooling air produced by a cooling fan provided on the rotor is scarcely supplied to a portion where the slip ring and the brush abut against each other. Due to these contributing factors, the temperatures of the slip ring and the brush rise high around the portion where the slip ring and the brush abut against each other. In this situation, when the temperature of the brush rises high, the wear rate becomes large, thereby causing the problem of decrease in the brush lifetime.

Accordingly, to date, a structure has been utilized in which radiating fins are provided outside the brush holder so that heat generated in the brush is radiated to the outside through thermal transfer (e.g., refer to Patent Document 1). Alternatively, a structure has been proposed in which the brush is held by a metal brush holder and a plate for supplying a magnetic-field current to the brush integrally molded with a brush holder base for holding the brush holder are connected with a bracket through the intermediary of a seal material so that heat generated in the brush is radiated to the bracket (e.g., refer to Patent Document 2). Further alternatively, a structure has been proposed in which a vent hole for cooling the brush and exhausting brush abrasion powder is provided in the brush holder so that the temperature of the brush is lowered and hence the brush lifetime is raised (e.g., refer to Patent Document 3).

PRIOR ART REFERENCE

Patent Document

[Patent Document 1] Japanese Patent Application Laid-Open No. 2003-047207
[Patent Document 2] Japanese Patent Application Laid-Open No. 2008-236979
[Patent Document 3] Japanese Patent Application Laid-Open No. 2009-177993

DISCLOSURE OF THE INVENTION

Problems to be Solved by the Invention

However, in the conventional apparatus disclosed in Patent Document 1, because the surface area of the brush holder is small, the number and the size of radiating fins that can be provided on the outer side face of the brush holder are small. In the case where this structure is applied to an electric rotating machine for vehicle electric power generation, in which there is utilized a structure where the inside thereof is cooled with cooling air caused by rotating the rotor, and the rotation speed of the electric rotating machine is low, it is difficult to supply plentiful cooling air to the radiating fins provided on the outer side face of the brush holder. Furthermore, a magnetic-field current applied to a motor generator among electric rotating machines for vehicle electric power generation is larger than that for a common electric rotating machine for vehicle electric power generation; thus, high heat radiation capability is required. For that reason, there has been a problem that necessary and sufficient brush cooling capability cannot be obtained.

In the case of an electric power steering or the like, where the inside of the bracket in which the brush holder and the like are provided is sealed and there exists no problem of electric erroneous operation caused by a foreign material or the like, the conventional apparatus disclosed in Patent Document 2 is effective; however, in the case of an electric rotating machine for vehicle electric power generation or a motor generator having a structure in which an external foreign material can readily intrude in the vicinity of the brush holder, there has been a problem that a metal member having the same electric potential as that of the brush cannot be exposed outside a brush holder forming resin.

In the conventional apparatus disclosed in Patent Document 3, due to the brush-cooling vent hole provided in the brush holder, the size of the brush holder becomes large and the size of the vent hole that can be provided is approximately determined by the size of the brush holder; therefore, because it is difficult to make the cross-sectional area of the vent hole large, there has been a problem that brush cooling capability is limited.

The present invention has been implemented in order to solve the problems in the foregoing conventional apparatuses; the objective thereof is to provide an electric rotating machine that efficiently radiates heat, caused in the vicinity of a portion where the brush and the slip ring abut against each other, to the outside of the brush holder and that can prevent the temperature of the brush from excessively rising.

Means for Solving the Problems

An electric rotating machine according to the present invention is provided with a rotor having a magnetic-field iron core and a magnetic-field winding that are fixed on a rotation axle, a slip ring that is fixed on the rotation axle and supplies a magnetic-field current to the magnetic-field winding, a stator that is disposed on the outer circumferential surface of the rotor through a gap and has an armature winding, a housing to which the stator is fixed, a brush holder that is fixed to the housing and holds a brush that supplies a magnetic-field current to the magnetic-field winding by way of the slip ring, and a heat sink that is fixed to the housing and is provided with a magnetic-field circuit for controlling the magnetic-field current and a power circuit for controlling an armature current flowing in the armature winding; the electric rotating machine is characterized in that the brush holder is provided with an energization terminal for electrically connecting the magnetic-field circuit with the brush and a brush cooling metal member for cooling the brush.

Advantage of the Invention

In the electric rotating machine according to the present invention, the brush holder is provided with an energization terminal for electrically connecting the magnetic-field circuit with the brush and a brush cooling metal member for cooling the brush; therefore, because it is made possible to radiate heat, generated in a portion where the brush and the slip ring abut against each other, through a heat radiation unit provided in the brush holder, the temperature of the brush is prevented from excessively rising and hence an electric rotating machine having a long-lifetime brush can be provided.

BEST MODE FOR CARRYING OUT THE INVENTION

Embodiment 1

Figure 1:
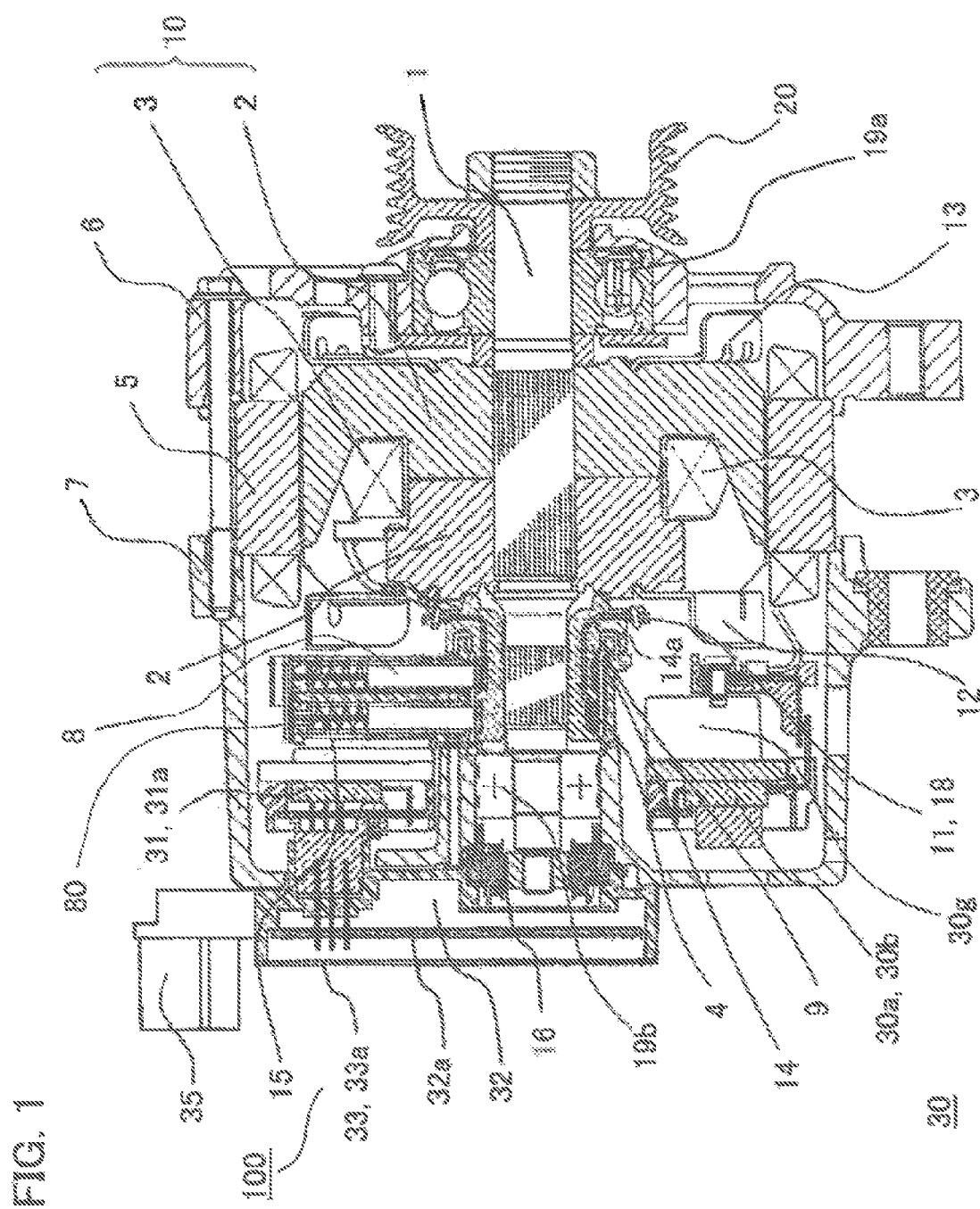
FIG. 1 is a cross-sectional view of an electric rotating machine according to Embodiment 1 of the present invention.

Hereinafter, an electric rotating machine according to Embodiment 1 of the present invention will be explained with reference to the drawings. FIG. 1 is a cross-sectional view of an electric rotating machine according to Embodiment 1 of the present invention. As the electric rotating machine according to Embodiment 1 of the present invention, a vehicle AC motor generator is illustrated; however, the electric rotating machine according to Embodiment 1 of the present invention can be applied to a vehicle AC generator.

In FIG. 1, an electric rotating machine 100 is provided with a front bracket 6 and a rear bracket 7 as housings, a rotation axle 1 that is pivotably supported by a bearing 19*a* of the front bracket 6 and a bearing 19*b* of the rear bracket 7, a stator 5 that is fixed on the front bracket 6 and the rear bracket 7 and has an armature winding, a rotor 10 that is fixed on the rotation axle 1 and has a magnetic-field iron core 2 and a magnetic-field winding 3, and a pulley 20 that is adhered to the front end of the rotation axle 1. The electric rotating machine 100 is coupled with the engine rotation axle (unillustrated) of an engine, through the intermediary of a belt (unillustrated) provided on the pulley 20. Because due to heat generated at a time when the electric rotating machine 100 is driven, the temperatures of the rotor 10 and the stator 5 rise, cooling fans 12 and 13 are provided on the respective end faces of the rotor 10.

The electric rotating machine 100 is also provided with a pair of slip rings 4 that is mounted on the rear portion of the rotation axle 1, a brush holder 80 mounted on the rear bracket 7 in such a way as to be situated on the outer circumference of the rear portion of the rotation axle 1, and a pair of brushes 8 that is disposed inside the brush holder 80 in such a way as to make contact with the pair of slip rings 4 in a sliding manner.

The electric rotating machine 100 is further provided with a power circuit unit 30 that converts DC electric power into AC electric power or vice versa, a magnetic-field circuit unit 31 that supplies a magnetic-field current to the magnetic-field winding 3 of the rotor 10, and a control circuit unit 32 that controls the power circuit unit 30 and the magnetic-field circuit unit 31. The control circuit unit 32 is electrically connected with a leading-to-outside connector 35 and is connected with the outside by way of a power-source terminal (unillustrated). The leading-to-outside connector 35 is disposed in the vicinity of the control circuit unit 32.

The power circuit unit 30 is provided with three power devices 30a and three power devices 30b that form positive-pole arms and negative-pole arms, respectively, of an after-mentioned three-phase bridge circuit; and a heat sink 30g that functions also as electrode members to be electrically connected with the power devices 30a and 30b. The connection between the power device 30a and the power device 30b is made by a conductive member (unillustrated), which is inserted into a resin and molded, and the heat sink 30g; a relaying wiring member (unillustrated) electrically connects the power devices 30a and 30b with the control circuit unit 32.

The control circuit unit 32 is provided with a control-circuit board 32a and a resin-made case 33 for containing the control-circuit board 32a. The case 33 has such a waterproof structure as prevents salt water and/or muddy water from intruding into the control-circuit board 32a, by use of a waterproof cover 33a or the like. The magnetic-field circuit unit 31 can be mounted on a single and the same board as the control-circuit board 32a or may be separated from the control-circuit board 32a.

Figure 2:
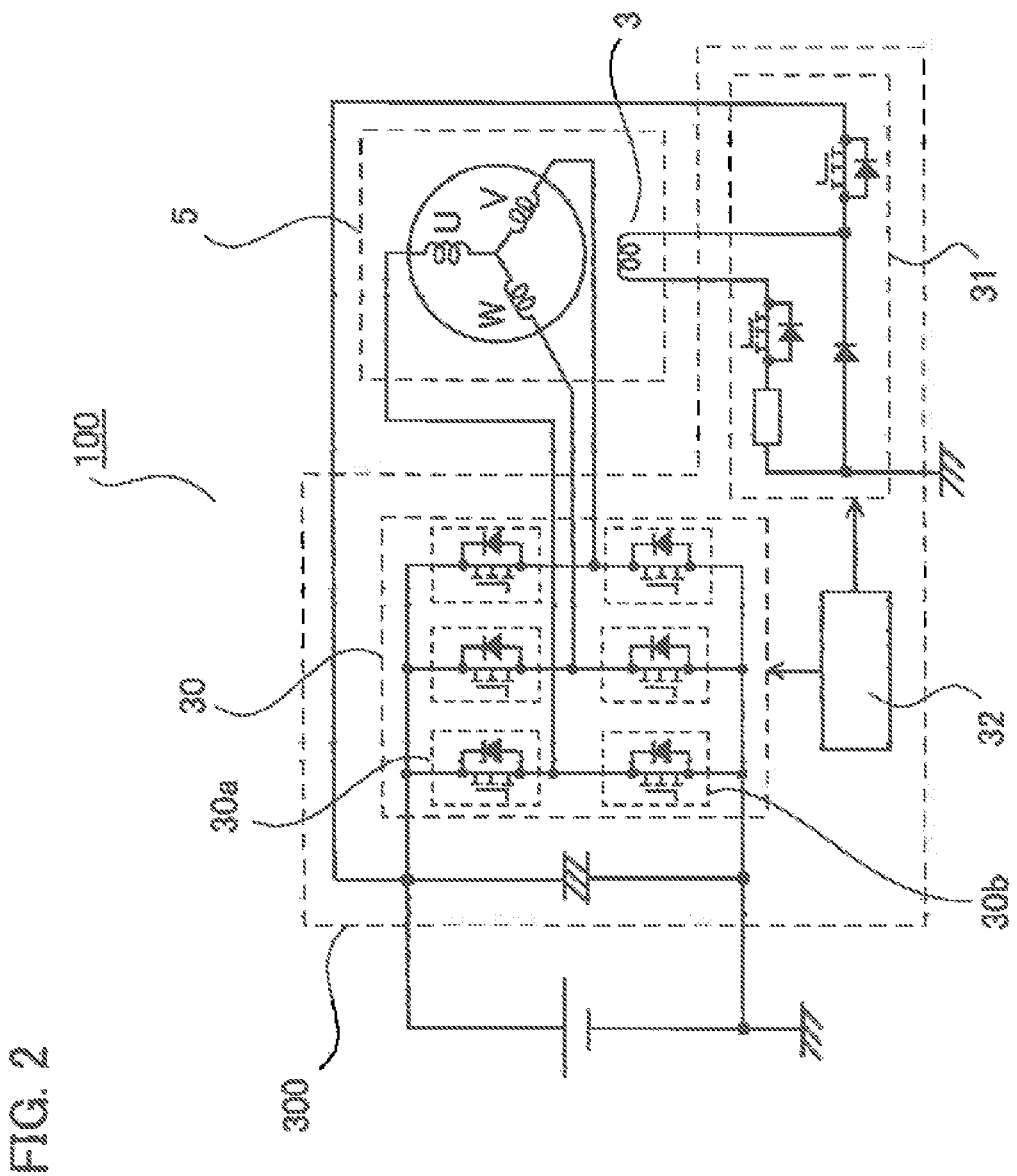
FIG. 2 is a circuit diagram of an electric rotating machine according to Embodiment 1 of the present invention.

FIG. 2 is a circuit diagram of an electric rotating machine according to Embodiment 1 of the present invention. In FIG. 2, a power unit 300 includes the power circuit unit 30, the magnetic-field circuit unit 31, and the control circuit unit 32. The power circuit unit 30 is provided with the three power devices 30a and the three power devices 30b that form the positive-pole arms and the negative-pole arms, respectively, of the foregoing three-phase bridge circuit.

Figure 17:
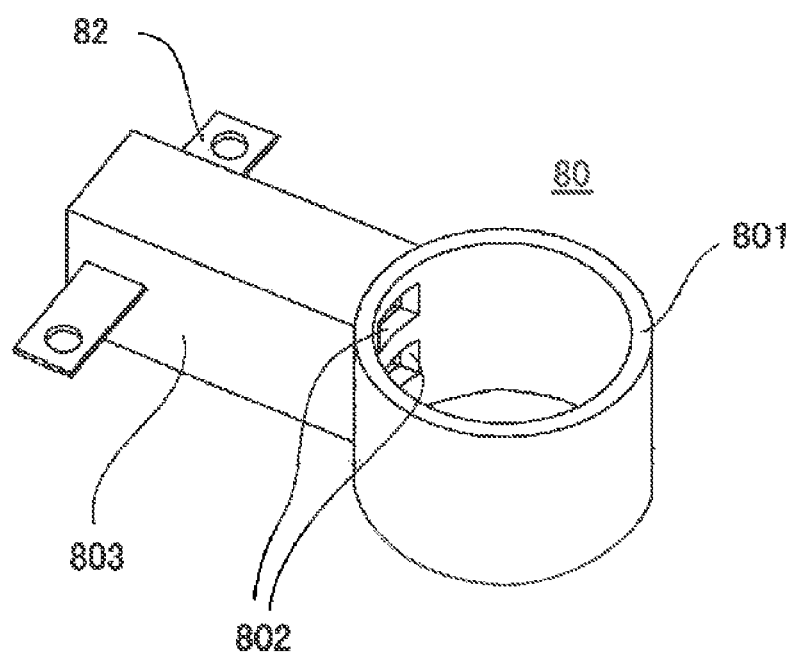
FIG. 17 is a perspective view of a brush holder for a conventional vehicle AC generator or motor generator.

Here, in order to further understand an electric rotating machine according to Embodiment 1 of the present invention, an example of conventional electric rotating machine will be explained. FIG. 17 is a perspective view of a brush holder for a conventional vehicle AC generator or motor generator. In FIG. 17, the brush holder 80 is formed of an insulating resin through injection molding or the like; the slip rings 4 (refer to FIG. 1) fixed to the rotation axle 1 are disposed inside a ring unit 801 of the brush holder 80. In the inner face of the ring unit 801, there are formed opening portions 802 for making the brushes 8 (refer to FIG. 1) contained in a brush holding unit 803 protrude and make contact with the slip rings 4. Because part of it is fixed to the rear bracket 7, the brush holder 80 is fixed to the inside of the rear bracket 7. The brush holder 80 is also provided with energization terminals 82 for supplying a magnetic-field current to the brush.

In the case where the brush holder 80 having the foregoing structure is applied to the electric rotating machine 100 illustrated in FIG. 1, a magnetic-field current from the magnetic-field circuit unit 31 is supplied by way of the brush 8 held by the brush holder 80 fixed to the rear bracket 7 and the slip ring 4 mounted on the rotation axle 1; however, because the fixed brush 8 and the rotating slip ring 4 make contact with each other, the friction between them causes heat in the sliding portions of the brush 8 and the slip ring 4. Moreover, in the sliding portions, the brush 8 and the slip ring 4 are held in contact with each other; therefore, the electric resistance at the sliding portions also causes heat. Furthermore, at the same time, energization causes Joule heat in the materials. Because in order to prevent the intrusion of external foreign materials or water, there exists only a gap of the labyrinth, formed of a resin mold 14, in the space between the brush holder 80 and the slip ring 4, the inflow of cooling air is restricted. For the foregoing reasons, there is posed a problem that the brush temperature rises and hence the brush lifetime is shortened.

Moreover, a vehicle AC generator or motor generator has a structure in which the inside thereof is cooled by cooling air produced through the rotation of the rotor on which a fan is provided. Accordingly, a great number of vent holes are provided in the rear bracket 7; thus, external foreign materials can readily intrude in the vicinity of the brush holder. In order to prevent the members from being short-circuited by foreign materials, the abutting portion between the slip ring 4 and the brush 8 is hermetically sealed except for a small gap for exhausting brush abrasion powder in the labyrinth structure formed of the slip ring mole resin and the brush holder 80 into which foreign materials are not likely to intrude. Therefore, there exists no effective heat radiation path in the brush 8 itself or in the vicinity of the abutting portion between the brush 8 and the slip ring 4; thus, there is a problem that the brush temperature becomes high.

Therefore, in the electric rotating machine according to Embodiment 1 of the present invention, a brush cooling metal member other than the energization terminal is provided in the brush holder 80, as described later, and is connected with a low-temperature portion (such as the heat sink 30g for cooling the power unit) inside a vehicle AC generator or motor generator so that heat generated in the brush or the abutting portion between the brush and the slip ring is efficiently radiated.

Figure 3:
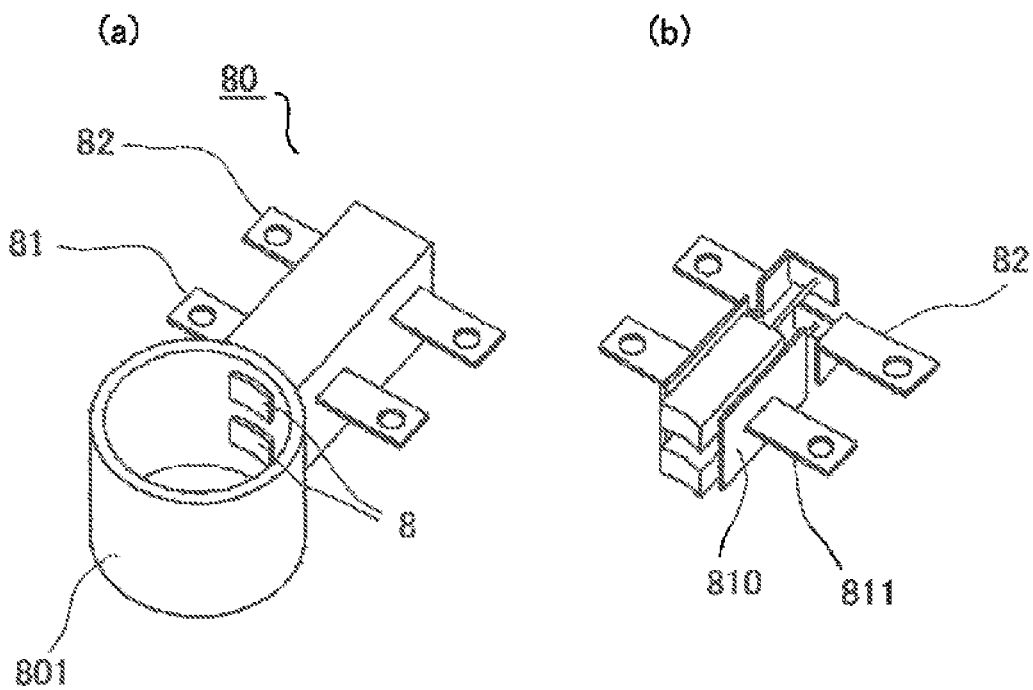
FIG. 3 is a set of enlarged perspective views of a brush holder and brushes, energization terminals, and brush cooling metal members included in the brush holder according to Embodiment 1 of the present invention.

FIG. 3 is a set of enlarged perspective views of a brush holder and brushes, energization terminals, and brush cooling metal members included in the brush holder according to Embodiment 1 of the present invention; FIG. 3(a) illustrates a brush holder and FIG. 3(b) illustrates brushes, energization terminals, and brush cooling metal members that are provided inside the brush holder. As illustrated in FIG. 3(a), brush cooling metal members 81 other than the energization terminals 82 are arranged in the brush holding unit 803 of the brush holder 80. The brush cooling metal member 81 is insert-molded or outsert-molded with the brush holder forming resin so as to be fixed to the brush holding unit 803.

Each of the brush cooling metal members 81 is provided in such a way that at least part thereof is exposed outside one of the both sides of the brush holding unit 803 in the brush holder 80. As a result, heat generated in the brush 8 or the abutting portion between the brush 8 and the slip ring 4 is transferred to the brush cooling metal member 81 and then radiated to the outside of the brush holder 80. Because the brush cooling metal member 81 is insert-molded or outsert-molded in the brush holder 80, the cost can be reduced in comparison with the case where the brush cooling metal member 81 is provided extra.

As illustrated in FIG. 3(b), the brush cooling metal members 81 are arranged in the brush forming resin in such away as to surround the both sides of the brush 8. The brush cooling metal member 81 is formed of first metal members 810 that cover the side surfaces of the brush 8 and second metal members 811 that are coupled with the respective surfaces of the first metal members 810 and protrude approximately vertically from the surfaces. The first metal member 810 is insert-molded or outsert-molded in the resin included in the brush holder 80. The brush cooling metal member 81 is provided in such a way as to be insulated from the brush 8. As a method of securing the insulation, the first metal member 810 is provided in such a way as to be along the surface of the brush 8 through the intermediary of a resin layer of, for example, approximately 0.5 [mm] and the second metal member 811 is fixed to the first metal member 810 so that the brush cooling metal member 81 and the brush 8 do not directly make contact with each other.

The heat radiation performance of the brush cooling metal member 81 formed of the first metal member 810 and the second metal member 811 can be raised in proportion to the area of the first metal member 810 that is disposed in parallel with the space containing the brush 8. In order to enlarge the area of the first metal member 810, the first metal member 810 is folded in accordance with the space containing the brush 8 and, preferably, is made to surround the four faces of the brush 4; as a result, the area can be enlarged as much as possible. Furthermore, the first metal member 810 of the brush cooling metal member 81 is disposed, like a framework, in the brush holder 80; therefore, the mechanical strength of the whole brush holder 80 is raised and hence the brush holder 80 can be prevented from being broken when it undergoes external weight or impact.

In Embodiment 1, the insulation between the brush 8 and the brush cooling metal member 81 is performed by a resin included in the brush holder 80; however, for example, the brush cooling metal member 81 may be coated with an insulating material through thermal spraying or laminating. As a result, even in the case where an external foreign material adheres to the second metal member 811 of the brush cooling metal member 81 exposed from the brush holder 80 or even in the case where the second metal member 811 of the brush cooling metal member 81 is provided in such a way as to make contact with other members in a vehicle AC generator or motor generator, neither leakage of the magnetic-field current nor short-circuiting is caused.

Figure 4:
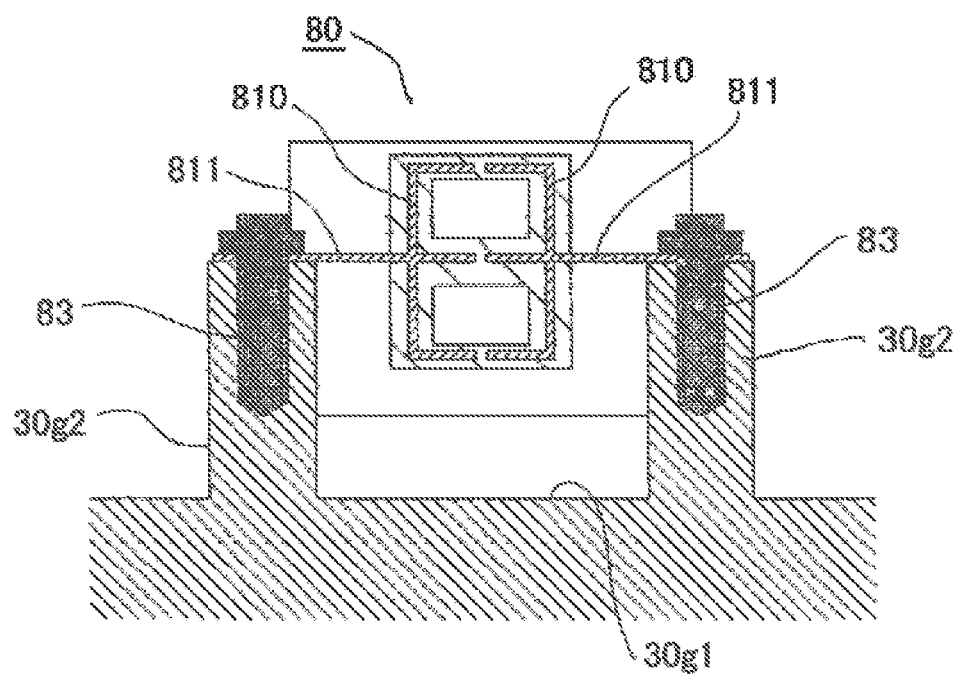
FIG. 4 is a schematic drawing illustrating a cross section including a surface where the brush holder and the heat sink are connected with each other, in an electric rotating machine according to Embodiment 1 of the present invention.

FIG. 4 is a schematic drawing illustrating a cross section including a surface where the brush holder and the heat sink are connected with each other, in an electric rotating machine according to Embodiment 1 of the present invention. The brush holder 80 illustrated in FIG. 4 corresponds to a cross section taken along A-A line in FIG. 3. In FIG. 4, the first metal member 810 of the brush cooling metal member 81 has such an approximately E-shaped cross section as surrounds half a round of a pair of brushes 8; a pair of first metal members 810 of the brush cooling metal member 81 are arranged in such a way as to surround approximately the whole round of the brushes 8.

A screw 83 couples a boss portion of the second metal member 811, which is part of the brush cooling metal member 81 exposed from the brush holder 80, with a boss portion provided in a fin 30g2 of the heat sink 30g on which the power circuit is mounted. Instead of fixing the second metal member 811 exposed from the brush holder 80 to the heat sink 30g by use of the screw 83, the brush holder 80 may be fixed to the heat sink 30g by use of an adhesive or through swaging or the like.

The heat sink 30g is to cool the power circuit and is designed in such a way that cooling air produced by the rotation of the rotor is efficiently supplied to the fin 30g2 protruding from a base surface 30g1. Due to the effect of cooling air, the temperature of the heat sink 30g becomes lower during the operation than the temperatures of the bracket and the like. Through thermal transfer, the brush cooling metal member 81 exposed from the brush holder 80 radiates heat generated in the brush 8 or the abutting portion between the brush 8 and the slip ring 4 to the heat sink 30g connected therewith. For these reasons, heat is efficiently radiated from the brush 8, so that the temperature of the brush 8 is lowered. In terms of the brush coolability, this heat radiation model is superior to the model in which the heat sink 30g or the like is mounted on the outer circumference of the brush holder 80 so that heat generated in the vicinity of the brush 8 is exhausted to the external atmosphere. In addition, because the exposed portion of the brush cooling metal member 81 is situated in a space where a great amount of cooling air flows, it can be expected that heat is radiated from the exposed portion of the brush cooling metal member 81.

The portion, of the brush cooling metal member 81, that is connected with the heat sink 30g concurrently has a brush holder fixing structure. As a result, it is not required to provide an extra brush holder fixing structure; thus, the amount of the brush-holder material and the production cost are reduced. Furthermore, in the case where the brush holder 80 has an extra fixing structure, the synergistic effect of this extra fixing structure and the brush holder fixing structure of the brush cooling metal member 81 makes the brush holder fixing strength one step higher.

When the brush cooling metal member 81 is utilized for fixing the brush holder 80, there can be prevented the problem, for example, slackness of a screw, posed by the death of resin, which is a shape change caused by a temperature cycle or a change over time, in contrast to the case where a brush holder forming resin or the like is utilized for fixing the brush holder 80. The brush cooling metal member 81 and the heat sink 30g are fixed to each other through screwing, swaging, or the like, so that the portion where the brush cooling metal member 81 and the heat sink 30g make contact with each other is pressed or filled with a material having a small heat conductivity; thus, the contact thermal resistance can be reduced. As a result, the thermal resistance of the heat radiation path through the brush cooling metal member 81 is reduced; thus, the temperature of the brush can more efficiently be reduced. In the case of the brush holder 80 according to Embodiment 1, because the fixation at the boss portion is added to the original fixing mechanism, the resonance frequency thereof can be set higher than that of a brush holder that is held only an ordinary fixing mechanism. The vibration reliability of the brush holder according to Embodiment 1 can be raised.

Embodiment 2

Figure 5:
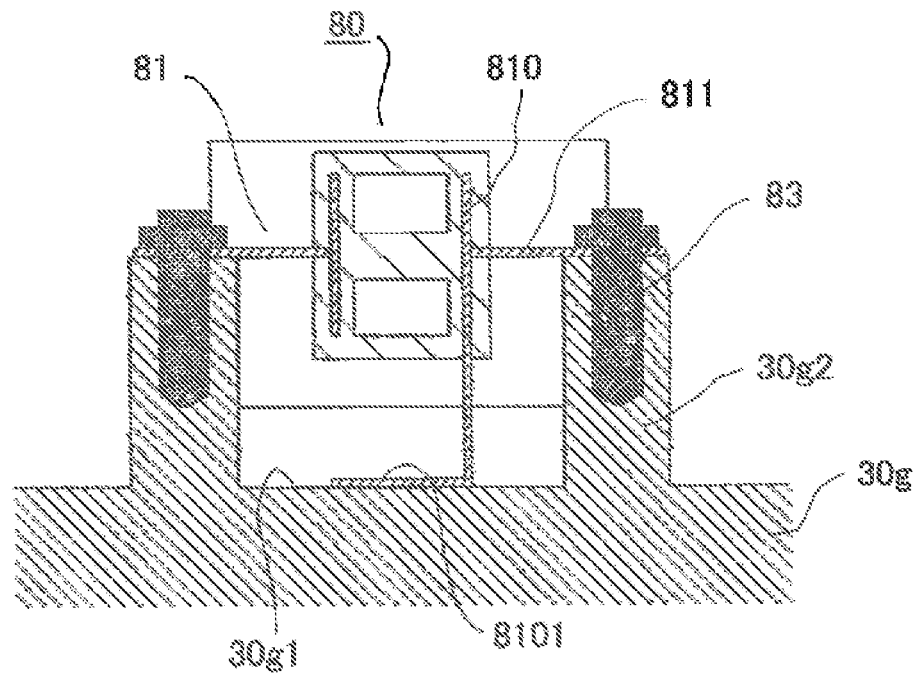
FIG. 5 is a schematic drawing illustrating a cross section including a surface where the brush holder and the heat sink are connected with each other, in an electric rotating machine according to Embodiment 2 of the present invention.

FIG. 5 is a schematic drawing illustrating a cross section including a surface where the brush holder and the heat sink are connected with each other, in an electric rotating machine according to Embodiment 2 of the present invention. In FIG. 5, the first metal member 810 of the brush cooling metal member 81 exposed from the brush holder 80 extends toward the base surface 30g1 of the heat sink 30g;

one end 8101 of the first metal member 810 is folded in such a way as to face the base surface 30g1 of the heat sink 30g and forms a boss portion. The end 8101 of the first metal member 810 makes contact with and connected with the base surface 30g1 of the heat sink 30g.

In Embodiment 2, the contact area of the connecting surface where the brush cooling metal member 81 and the heat sink 30g make contact with each other can be set large. As a result, the contact thermal resistance of this connecting surface can be reduced; thus, Embodiment 2 has an advantage in terms of radiating heat from the brush 8. Moreover, the number of heat radiation paths to the heat sink 30g increases, thus, Embodiment 2 has an advantage in terms of the heat radiation performance. Furthermore, because the boss portion of the first metal member 810 of the brush cooling metal member 81 in the brush holder 80 is fixed to the base surface 30g1 of the heat sink 30g, there is demonstrated a rise in the fixing strength and a suppression effect for vibration; therefore, the failure, vibration, and the like of the brush holder 80 can be reduced. Accordingly, in the case of the brush holder 80, because the fixation at the boss portion and the fixation at the base surface of the heat sink is added to the original fixing mechanism, the resonance frequency thereof can be set higher than that of a brush holder that is held only an ordinary fixing mechanism; therefore, the brush holder can raise its reliability in vibration.

Figure 6:
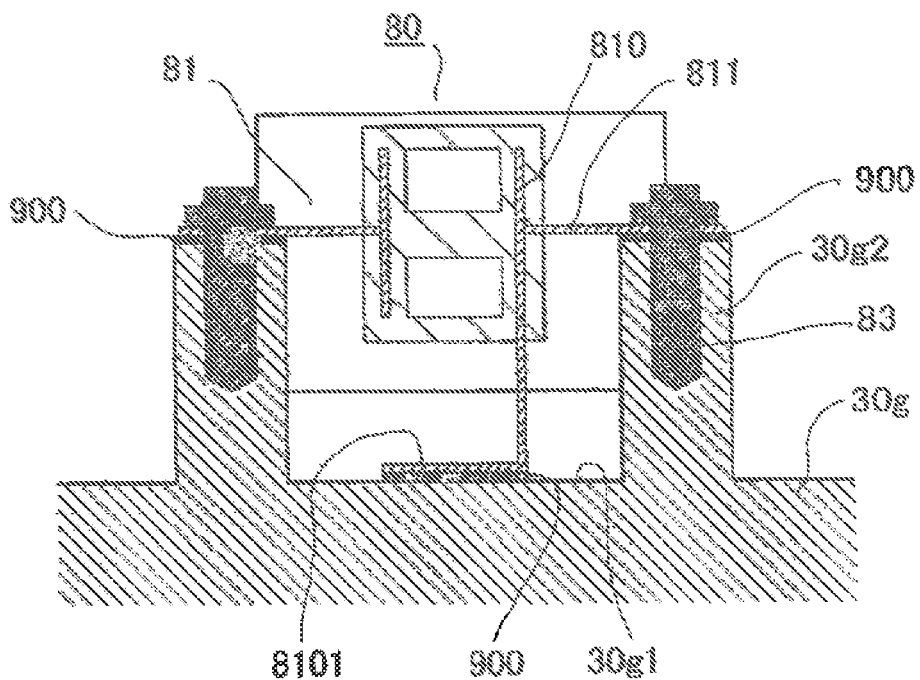
FIG. 6 is a schematic drawing illustrating a cross section including a surface where the brush holder and the heat sink are connected with each other, in an electric rotating machine according to Embodiment 3 of the present invention.

FIG. 6 is a schematic drawing illustrating a cross section including a surface where the brush holder and the heat sink are connected with each other, in an electric rotating machine according to Embodiment 3 of the present invention. In FIG. 6, the first metal member 810 of the brush cooling metal member 81 exposed from the brush holder 80 extends toward the base surface 30g1 of the heat sink 30g; an end portion 8101 of the first metal member 810 is folded in such a way as to face the base surface 30g1 of the heat sink 30g and forms a boss portion. The end portion 8101 of the first metal member 810 makes contact with and connected with the base surface 30g1 of the heat sink 30g.

In Embodiment 3, the end portion 8101 of the first metal member 810 in the brush cooling metal member 81 and the second metal member 811 are connected with the base surface 30g1 and the fin 30g2, respectively, of the heat sink 30g, through the intermediary of a high-heat-radiation gap filling material 900. As a result, because the contact resistances of these connecting surfaces are reduced, the brush cooling capability is raised. The provision of these high-heat-radiation gap filling materials 900 demonstrates an effect of preventing foreign materials from intruding into the gap between the brush cooling metal member 81 of the brush holder 80 and the heat sink 30g. Accordingly, for example, even in the case where an impact or a large temperature change occurs, the contact resistance of the contact surface, which is part of the heat radiation path, between the brush cooling metal member 81 and the heat sink 30g is not deteriorated.

Embodiment 4

Figure 7:
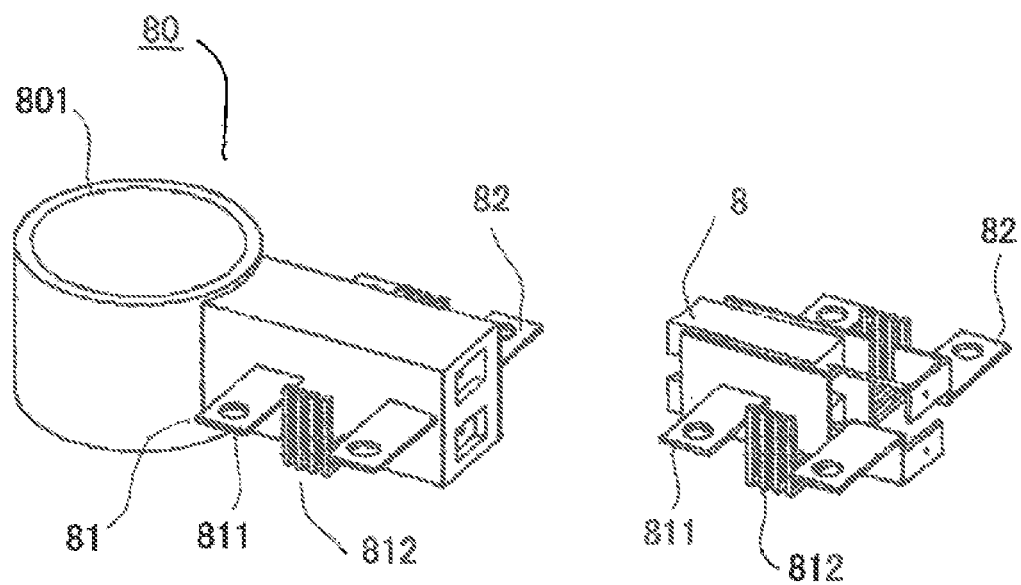
FIG. 7 is a set of perspective views of a resin-molded brush holder of an electric rotating machine according to Embodiment 4 of the present invention.

FIG. 7 is a set of perspective views of a resin-molded brush holder of an electric rotating machine according to Embodiment 4 of the present invention; FIG. 7(*a*) illustrates a brush holder and FIG. 7(*b*) illustrates brushes, energization terminals, and brush cooling metal members that are provided inside the brush holder. As illustrated in FIGS. 7(*a*) and 7(*b*), a brush cooling metal member 81 is formed of a first metal member 810 that is disposed along the side surfaces of the brush 8, a second metal member 811 that perpendicularly extends from the surface of the first metal member 810, and a plurality of third metal members 812 that perpendicularly extend from the surface of the first metal member 810 and then are folded approximately at a right angle. The first metal member 810 is inserted into a resin included in a brush holder 80; the second metal member 811 and the third metal member 812 are exposed outside the brush holder resin. The third metal members 812 form a heat radiation unit having the shape of a heat sink with radiating fins or the shape of a comb.

In Embodiment 4, the second metal member 811 and the third metal member 812, exposed outside the brush holder 80, of the brush cooling metal member 81 facilitates heat radiation from the brush holder 80 to the external atmosphere. Then, heat generated in the brush 8 or in the contact surface where the brush 8 and the slip ring 4 make contact with each other is divided into heat that is transferred from the brush holder 80 to the heat sink 30g, through the second metal member 811, and heat that is transferred to the external atmosphere of the brush holder 80, through the third metal member 812. As a result, the brush cooling effect of the brush holder 80 is raised and the temperature of the heat sink 30g with which the brush cooling metal member 81 is connected is prevented from rising high. The second metal member 811 of the brush cooling metal member 81 and the heat radiation unit formed of the third metal members 812 are disposed in a space where a great amount of cooling air flows. Therefore, cooling air collides with the heat radiation unit and becomes a turbulent flow under the condition of a lower flow rate. As a result, the heat-transfer efficiency of not only the foregoing heat radiation unit of the brush holder 80 but also the surface of the brush holder 80 is raised and hence the brush cooling effect is improved.

Embodiment 5

Figure 8:
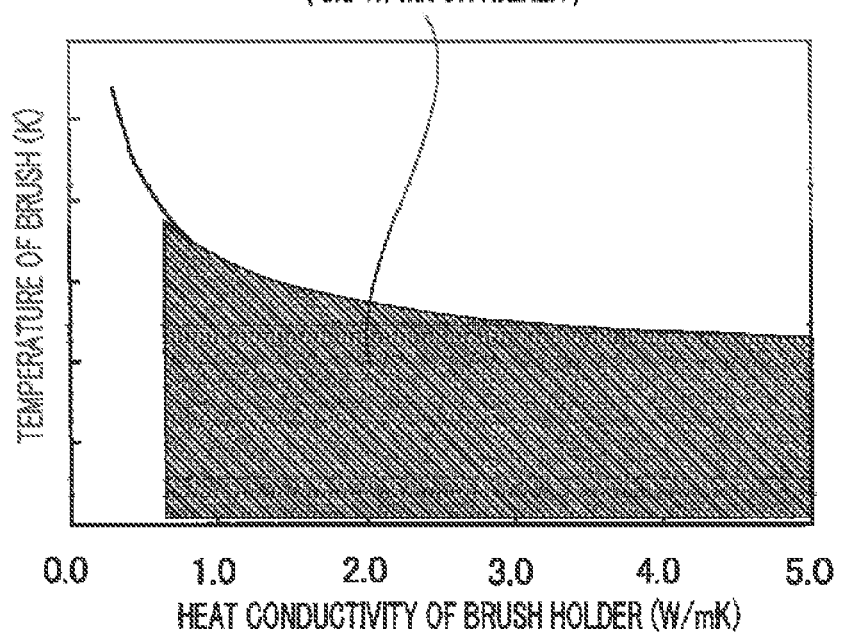
FIG. 8 is a characteristic graph representing the relationship between the brush-holder heat conductivity and the brush temperature rise in an electric rotating machine according to Embodiment 5 of the present invention.

The brush holder of an electric rotating machine according to Embodiment 5 of the present invention is formed of a resin, such as a PPS- or PBT-based resin, that has a heat conductivity of 0.8 [W/mK] or higher and can effectively demonstrate a brush temperature reduction effect. FIG. 8 is a characteristic graph representing the relationship between the brush-holder heat conductivity and the brush temperature rise in an electric rotating machine according to Embodiment 5 of the present invention; the ordinate denotes the temperature [K] of a brush, and the abscissa denotes the heat conductivity [W/mk] of a brush holder.

The temperature of a brush, which rises at a time when a vehicle AC generator or motor generator generates electric power, when regenerative power generation is performed, or when driving operation is performed, is lowered by increasing the heat conductivity of the brush holder. This may be because when heat generated in the vicinity of the brush is transferred to the brush cooling metal member 81 illustrated in Embodiments 1 through 4 by way of the brush holder 80 and then is exhausted to the outside of the brush holder 80, the thermal resistance between the brush 8 and the brush cooling metal member 81 is reduced.

The heat generated in the vicinity of the brush 8 is radiated not only through the brush holder 80 but also through a plurality of heat radiation paths such as a heat radiation path passing through the slip ring 4 and a heat radiation path passing through the pigtails of the brush 8; however, the inventors of the present invention have confirmed that in the case where the heat conductivity of the brush holder 80 is 0.8 [W/mK] or lower, there can be demonstrated no effect of the extent that the heat generated in the vicinity of the brush is more transferred to the heat radiation path passing through the brush cooling metal member 81 than to the heat radiation path passing through the slip ring 4 or the pigtails of the brush 8 and hence no large brush temperature reduction effect can be obtained. Accordingly, the brush holder 80 of an electric rotating machine according to Embodiment 5 is formed of a resin having a heat conductivity of 0.8 [W/mK] or higher so that the brush temperature reduction effect can more effectively demonstrated.

In order to raise the heat conductivity, expensive filler is added to the resin included in the brush holder 80; thus, the price per unit mass increases. For that reason, when the heat conductivity of the brush holder 80 becomes 3.0 [W/mK] or higher, increase in the material cost is worried. Thus, with regard to the increase in the cost for the heat radiation performance, in order to maintain the cost performance at a high level, it is desirable that the heat conductivity of the brush holder 80 is set to 0.8 to 3.0 [W/mK].

Meanwhile, the resin included in the brush holder 80 and the brush cooling metal member 81 are integrated with each other through insert-molding or outsert-molding; therefore, when a temperature cycle is applied to the brush holder 80, distortion is caused in the vicinity of the interface boundary between the resin included in the brush holder and the brush cooling metal member 81 because the respective linear-expansion coefficients thereof are different from each other. The temperatures of the atmospheres where a vehicle AC generator or motor generator is placed largely change depending on the use condition and the temperature of the atmosphere outside the vehicle. Accordingly, the resin included in the brush holder requires measures for a crack caused by a temperature cycle. In some cases, when a crack is caused and develops, moisture or a foreign material that has intruded in the vicinity of the brush holder passes through the gap in the crack and reaches the abutting portion between the brush and the slip ring, thereby causing a malfunction of the electric rotating machine. In order to prevent the malfunction, it is required to reduce the difference between the respective linear-expansion coefficients of the brush holder forming resin and the brush cooling metal member.

Figure 9:
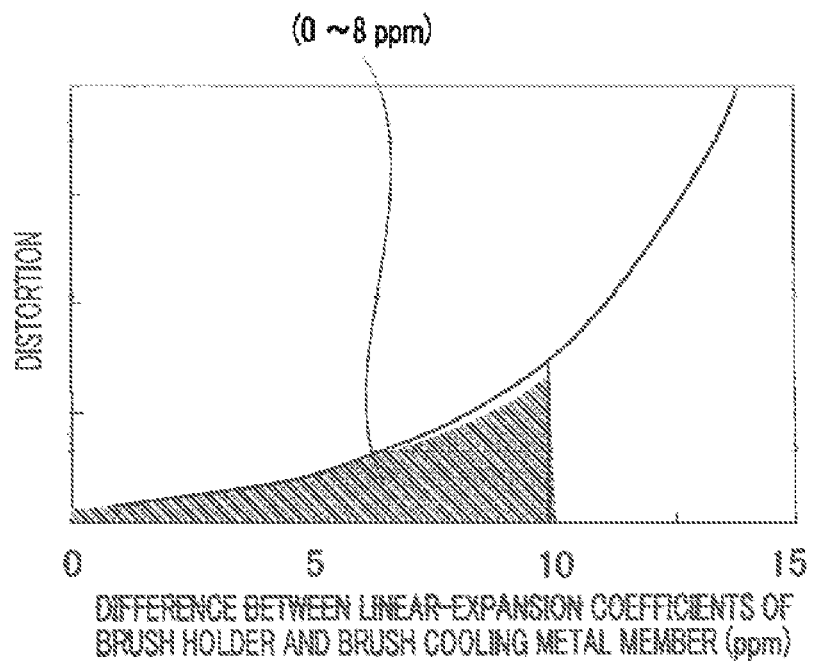
FIG. 9 is a characteristic graph representing the relationship between the difference between the respective linear-expansion coefficients of a brush holder forming resin and a brush cooling metal member and the amount of distortion caused in the brush holder forming resin that has undergone a temperature cycle, in an electric rotating machine according to Embodiment 5 of the present invention.

FIG. 9 is a characteristic graph representing the relationship between the difference between the respective linear-expansion coefficients of a brush holder forming resin and a brush cooling metal member and the amount of distortion caused in the brush holder forming resin that has undergone a temperature cycle, in an electric rotating machine according to Embodiment 5 of the present invention. The inventers of the present invention have confirmed that as represented in FIG. 9, when the difference between the respective linear-expansion coefficients of the resin included in the brush holder 80 and the brush cooling metal member 81 exceeds 10 [ppm], distortion in the vicinity of the interface boundary is frequently caused by a temperature cycle and hence a crack occurs. Therefore, in the brush holder of the electric rotating machine according to the present invention, the difference between the respective linear-expansion coefficients of the resin included in the brush holder 80 and the brush cooling metal member 81 is set to 10 [ppm] or smaller.

The brush cooling metal member 81 is formed of copper (including phosphor bronze) or brass. When the brush cooling metal member 81 is formed of one of these materials, heat transferred from the brush holder 80 is further transferred to the heat sink 30g through the intermediary of the brush cooling metal member 81 formed of one of these materials having a high heat conductivity. As a result, in contrast to the case where the brush cooling metal member 81 is formed of iron or the like having a low heat conductivity, a high brush temperature reduction effect is demonstrated. In this regard, when the brush cooling metal member 81 is formed of copper or brass, described above, a high brush temperature reduction effect can be secured; however, when the brush cooling metal member 81 is formed of a metal having a low heat conductivity, it is required that radiating fins are made to adhere to the outside thereof or that a great deal of brush cooling metal member 81 is provided, in order to make the brush holder 80 possess the same brush cooling performance.

For these reasons, by forming the brush cooling metal member 81 with copper or brass, the weight of the brush holder 80 can be reduced. As a result, the whole vehicle AC generator or motor generator can be lightened. The resin included in the brush holder 80 is formed of a PPS- or PBT-based resin. As a result, the difference between the respective linear-expansion coefficients of the brush cooling metal member 81 and the resin included in the brush holder 80 can be reduced. Moreover, it is made possible to form the brush holder 80, the resin itself included in which has a high heat resistance and a high mechanical strength. Furthermore, PPS and PBT have high recyclability and are excellent in terms of an environment aspect and the cost.

Embodiment 6

Figure 10:
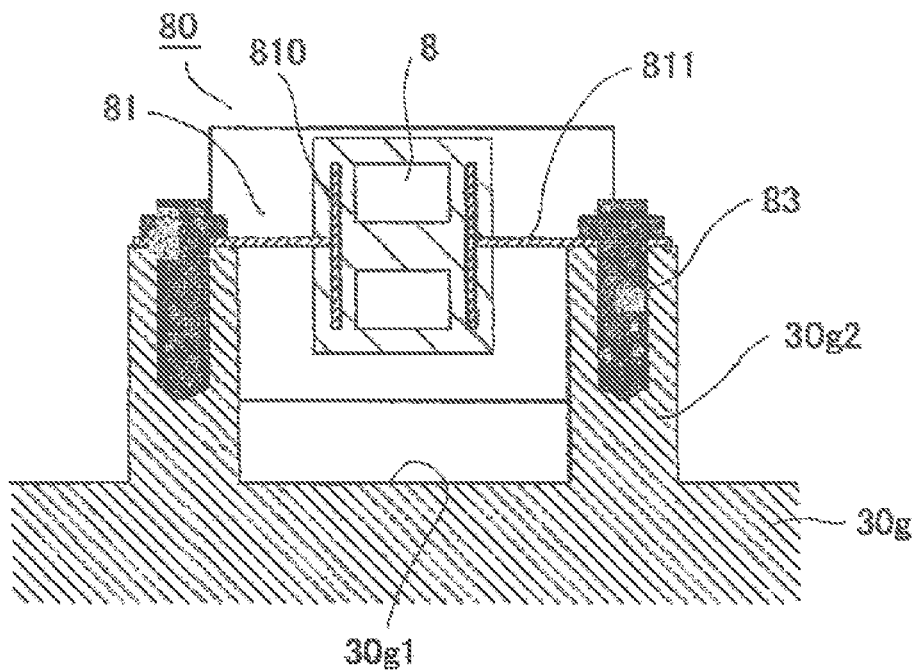
FIG. 10 is a schematic drawing illustrating a cross section including a surface where the brush holder and the heat sink are connected with each other, in an electric rotating machine according to Embodiment 6 of the present invention.

FIG. 10 is a schematic drawing illustrating a cross section including a surface where the brush holder and the heat sink are connected with each other, in an electric rotating machine according to Embodiment 6 of the present invention. In FIG. 10, the brush 8 and the brush cooling metal member 81 are insulated from each other by a resin included in the brush holder 80. In other words, at least the brush side face of the plate-shaped first metal member 810 in the brush cooling metal member 81 faces the brush 8 through the intermediary of the resin included in the brush holder 80; therefore, the brush 8 and the first metal member 810 of the brush cooling metal member 81 do not make contact with each other.

In Embodiment 6, at the same time when the brush cooling metal member 81 is insert-molded or outsert-molded in the brush holder 80, the insulation structure is formed. As a result, the time for producing the brush holder 80 can be shortened and hence the cost can be reduced. It is desirable that the thickness of the configuration member situated between the first metal member 810 of the brush cooling metal member 81 and the brush 8 is as thin as the formation or the strength is possible. When the thickness of the configuration member situated between the first metal member 810 of the brush cooling metal member 81 and the brush 8 is made thin, the ratio of the heat, out of heat generated in the vicinity of the brush, that passes through a heat radiation path formed of the brush cooling metal member 81 increases and hence the heat is transferred to the heat sink 30g; thus, the temperature reduction effect for the brush 8 can be enlarged.

Embodiment 7

Figure 11:
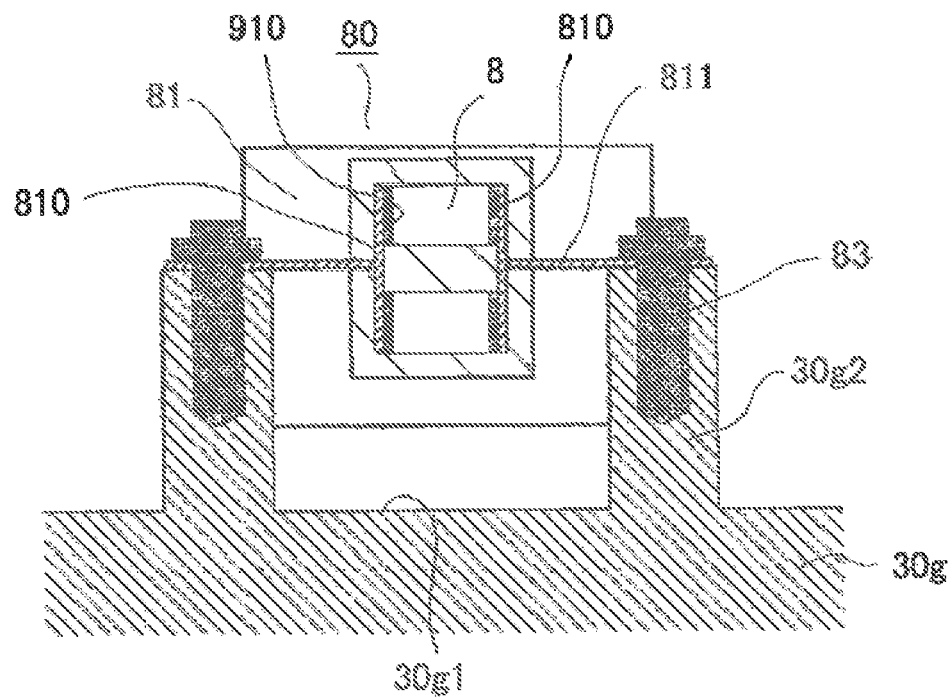
FIG. 11 is a schematic drawing illustrating a cross section including a surface where the brush holder and the heat sink are connected with each other, in an electric rotating machine according to Embodiment 7 of the present invention.

FIG. 11 is a schematic drawing illustrating a cross section including a surface where the brush holder and the heat sink are connected with each other, in an electric rotating machine according to Embodiment 7 of the present invention. In FIG. 11, the insulation between the brush 8 and the brush cooling metal member 81 is established by a member 910 that has a heat conductivity higher than that of the resin included in the brush holder 80 or that can be formed to have a small thickness. The resin sheet 910 including an insulating material having a high heat conductivity, for example, a high-heat-conductivity filler is adhered to the brush side face of the first metal member 810 in the brush cooling metal member 81, or an insulating material, which is adhered to that face through thermal spraying, laminating, or the like, is disposed.

When as described above, the insulation between the brush 8 and the brush cooling metal member 81 is secured by the insulating material 910 having a high heat conductivity or small-thickness capability, or both of them, the thermal resistance between the brush 8 and the brush cooling metal member 81 can largely be reduced. As a result, most of heat generated in the vicinity of the brush is attracted by a heat radiation path passing through the brush cooling metal member 81 and is transferred to the heat sink 30g having a low temperature, so that a high effect of suppressing the brush temperature rise can be obtained. Because as described above, the brush 8 and the brush cooling metal member 81 are arranged through the intermediary of a thin insulating material, the area required by the brush holder 80 itself becomes small; therefore, the amount of used molding resin is reduced and the weight of the brush holder 80 can also be reduced. As a result, the vehicle AC generator or motor generator can be lightened.

Embodiment 8

Figure 12:
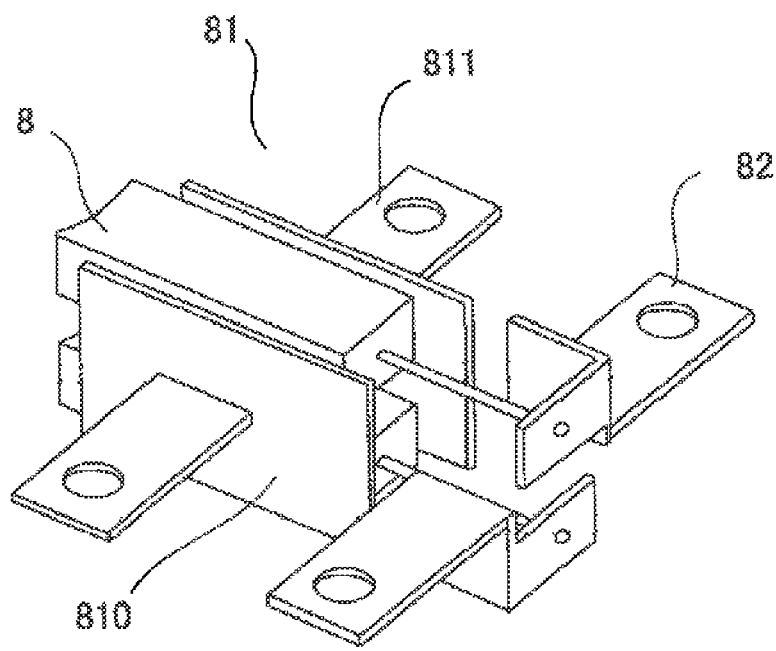
FIG. 12 is a perspective view of brushes, brush cooling metal members, and energization terminals contained in a brush holder forming resin of an electric rotating machine according to Embodiment 8 of the present invention.

FIG. 12 is a perspective view of brushes, brush cooling metal members, and energization terminals contained in a brush holder forming resin of an electric rotating machine according to Embodiment 8 of the present invention. As illustrated in FIG. 12, the brush cooling metal member 81 is formed of two first metal members 810 and two second metal members 811; the respective surfaces of the two first metal members 810 are enlarged as much as possible so as to meet almost all area of the side face of the brush 8; the two first metal members 810 are arranged in such a way as to face each other through the intermediary of the brush 8.

As a result, it is made possible to enlarge the area of the brush cooling metal member 81 that receives heat generated in the vicinity of the brush 8, through the intermediary of the brush holder 80; thus, the thermal resistance of this heat radiation path can be reduced. In this case, it is more desirable that the brush cooling metal members 81 are arranged in such a way as to surround the brush 8. Because the area of the brush cooling metal member 81 that receives heat of the brush 8 becomes larger and the brush cooling metal member 81 functions as the frame work in the brush holder, the structure strength is improved.

Embodiment 9

Figure 13:
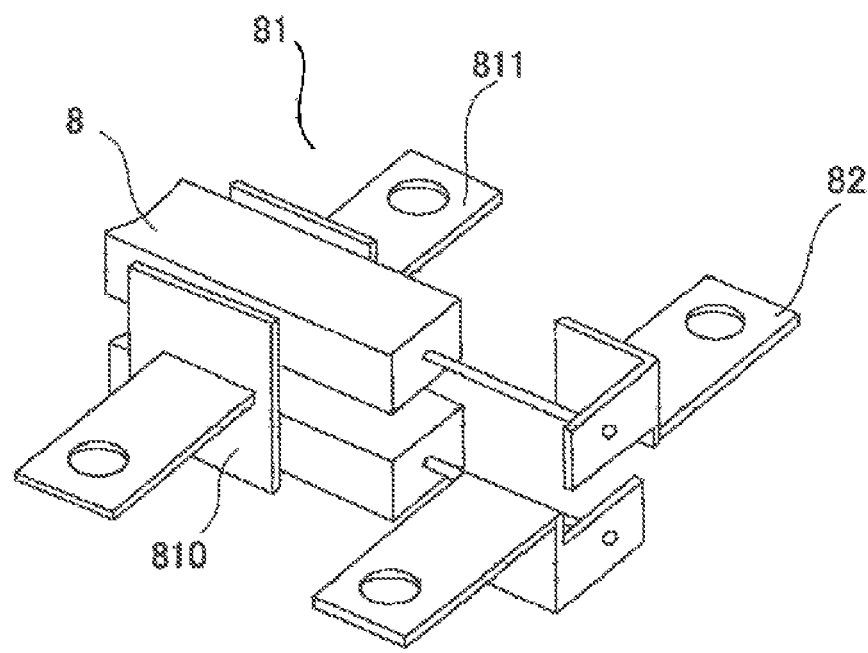
FIG. 13 is a perspective view of brushes, brush cooling metal members, and energization terminals contained in a brush holder forming resin of an electric rotating machine according to Embodiment 9 of the present invention.

FIG. 13 is a perspective view of brushes, brush cooling metal members, and energization terminals contained in a brush holder forming resin of an electric rotating machine according to Embodiment 9 of the present invention. As illustrated in FIG. 13, the first metal member 810 of the brush cooling metal member 81 is arranged in the vicinity of the contact portion between the slip ring 4 (unillustrated) and the brush 8. As described above, the first metal member 810 of the brush cooling metal member 81 is disposed as close to the contact portion between the slip ring 4 and the brush 8 as possible, so that the brush cooling effect can be enlarged. Moreover, even in the case where as illustrated in FIG. 12, restriction on the shape of the brush holder or the like does not allow the surface of the first metal member facing the brush 8 to extend in the longitudinal direction of the brush, the brush temperature reduction effect can be maintained.

Embodiment 10

Figure 14:
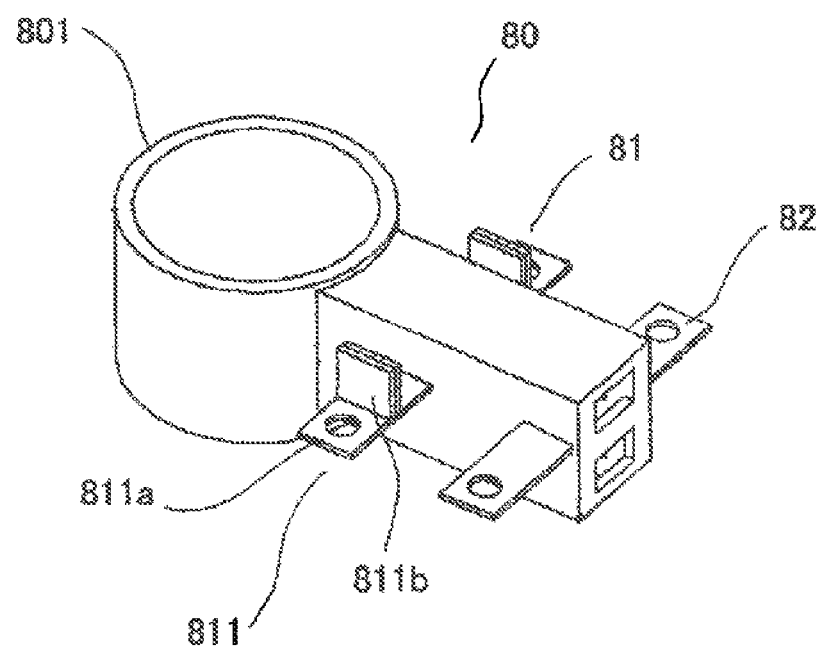
FIG. 14 is a perspective view of a brush holder of an electric rotating machine according to Embodiment 10 of the present invention.

FIG. 14 is a perspective view of a brush holder of an electric rotating machine according to Embodiment 10 of the present invention. The second metal member 811 of the brush cooling metal member 81 is configured with a first member 811a that extends approximately perpendicularly from the side face of the brush holder 80 and a plurality of second members 811b that are connected with the first member 811a and extend approximately perpendicularly from the first member 811a. As a result, the flexibility of designing can be raised when the brush holder 80 is formed. It is desirable that the brush cooling metal member 81 is situated at a position that does not hinder the flow of cooling air produced by the fan provided on the rotor.

Embodiment 11

Figure 15:
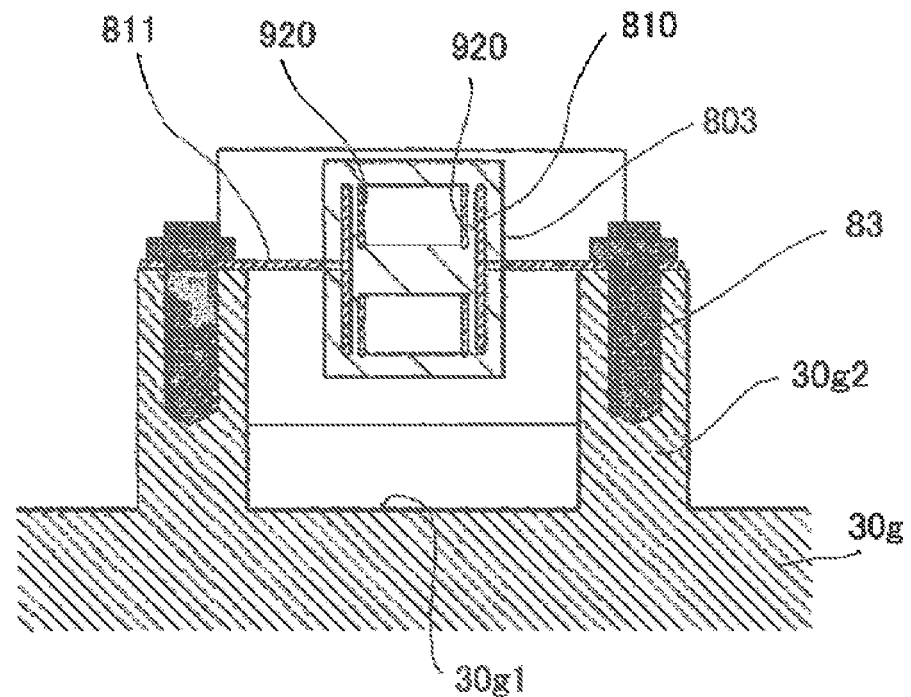
FIG. 15 is a perspective view of a brush holder of an electric rotating machine according to Embodiment 11 of the present invention.

FIG. 15 is a perspective view of a brush holder of an electric rotating machine according to Embodiment 11 of the present invention. As illustrated in FIG. 15, the brush holder 80 is provided with a metal plate 920 that is adapted to disperse heat and is mounted on the wall face in the inner space of the brush holding unit 803 in which the brush 8 is stored. The brush cooling metal member 81 is configured with the first metal member 810 and the second metal member 811 that are buried in the resin included in the brush holder 80 and face each other.

The metal plate 920 is formed of copper, aluminum, or iron. In Embodiment 11, the metal plate 920 for dispersing heat disperses heat generated in the vicinity of the brush toward the plane of the first metal member 810 of the brush cooling metal member 81; by making the heat conductive area large, the thermal resistance of this path can be reduced. As a result, a brush holder having a high brush cooling performance can be configured.

Embodiment 12

Figure 16:
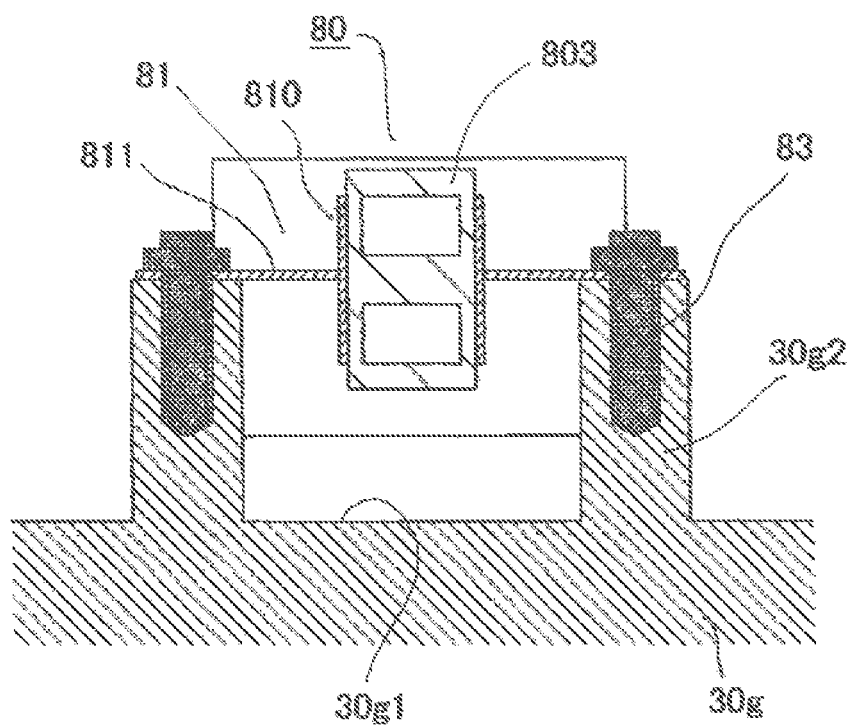
FIG. 16 is a schematic drawing illustrating a cross section including a surface where the brush holder and the heat sink are connected with each other, in an electric rotating machine according to Embodiment 12 of the present invention.

FIG. 16 is a schematic drawing illustrating a cross section including a surface where the brush holder and the heat sink are connected with each other, in an electric rotating machine according to Embodiment 12 of the present invention. As illustrated in FIG. 16, the brush cooling metal member 81 is formed of the metal members 801 that are fixed to the respective outer side faces of the brush holder 80 and the second metal members 811 that are fixed to the respective first metal members 810.

Embodiment 12 makes it possible to raise the shape flexibility of the brush cooling metal member 81 that can be provided. Accordingly, the brush cooling metal member 81 can be disposed with a shape thereof that does not hinder the flow of air in the vicinity of the brush holder 80. As a result, the flow rate of cooling air that is blown off against the brush 8 and the heat sink 30g can be prevented from being reduced; thus, the temperature rise in the brush 8 and the heat sink 30g can be reduced. It is desirable that the brush cooling metal member 81 mounted on the outer side faces of the brush holder 80 is fixed with a high-heat-conductivity adhesive or with a screw, i.e., through a method that can reduce as much as possible the thermal resistance of the contact portion between the brush holder 80 and the brush cooling metal member 81. As a result, the thermal resistance of this heat radiation path can be reduced; thus, brush temperature reduction effect can be raised.

INDUSTRIAL APPLICABILITY

The present invention can be applied to the field of the automobile industry, especially, to the field of an electric rotating machine to be mounted in an automobile.

Description of Reference Numerals

100: electric rotating machine
1: rotation axle
2: magnetic-field iron core
3: magnetic-field winding
4: slip ring
5: stator
6, 7: housing
8: brush
9: slip ring terminal
10: rotor
11: lead wire winding portion
12: cooling fan
13: cooling fan
14: slip ring mold portion
15: spring
16: rotation sensor
18: coil lead wire
19: bearing
20: pulley
30: power circuit unit
30a: power device
30b: power device
30g: heat sink
30g1: base surface of heat sink
30g2: fin
31: magnetic-field circuit unit
32: control circuit unit
32a: control-circuit board
33a: waterproof cover
35: leading-to-outside connector
40: exposed portion
50: molding resin
60: molded device
80: brush holder
81: brush cooling metal member
810: first metal member
811: second metal member
82: energization terminal
83: screw
900: high-heat-radiation gap filling material
812: third metal member
910: resin sheet
920: metal plate

The invention claimed is:

1. An electric rotating machine comprising:
   a rotor having a magnetic-field iron core and a magnetic-field winding that are fixed on a rotation axle;
   a slip ring that is fixed on the rotation axle and supplies a magnetic-field current to the magnetic-field winding;
   a stator that is disposed on the outer circumferential surface of the rotor through a gap and has an armature winding;
   a housing to which the stator is fixed;
   a brush holder that is fixed to the housing and holds a brush that supplies a magnetic-field current to the magnetic-field winding by way of the slip ring; and
   a heat sink that is fixed to the housing and is equipped with a magnetic-field circuit for controlling the magnetic-field current and a power circuit for controlling an armature current flowing in the armature winding, wherein the brush holder is provided with an energization terminal for electrically connecting the magnetic-field circuit with the brush and a brush cooling metal member for cooling the brush, wherein the brush cooling metal member is connected with the heat sink.

2. The electric rotating machine according to claim 1, wherein the brush cooling metal member is electrically insulated from the brush.

3. The electric rotating machine according to claim 1, wherein the brush cooling metal member is insertion-molded in the brush holder.

4. The electric rotating machine according to claim 1, wherein the brush cooling metal member is provided with an exposed portion, at least part of which is exposed outside the brush holder.

5. The electric rotating machine according to claim 4, wherein said part of the exposed portion of the brush cooling metal member is connected with the heat sink.

6. The electric rotating machine according to claim 5, wherein the brush cooling metal member and the heat sink are connected with each other through the intermediary of at least one of a resin, grease, and an adhesive that have a high heat conductivity.

7. The electric rotating machine according to claim 4, wherein the exposed portion of the brush cooling metal member has a structure for directly or indirectly fixing the brush holder to the housing.

8. The electric rotating machine according to claim 4, wherein the heat sink has a boss portion for fixing a brush holder, and the exposed portion of the brush cooling metal member is fixed to the boss portion of the heat sink.

9. The electric rotating machine according to claim 4, wherein the exposed portion of the brush cooling metal member is fixed to the base surface of the heat sink.

10. The electric rotating machine according to claim 4, wherein the exposed portion of the brush cooling metal member is formed in the shape of a fin or a comb tooth, at least part of which is bent.

11. The electric rotating machine according to claim 1, wherein the brush holder is formed of a material having a heat conductivity of 0.8 W/mK or higher.

12. The electric rotating machine according to claim 1, wherein the difference between the respective linear-expansion coefficients of the material forming the brush holder and the material of the brush cooling metal member is 10 ppm or smaller.

13. The electric rotating machine according to claim 1, wherein the material forming the brush holder is PPS or PBT, and the material forming the brush cooling metal member is copper or brass.

14. The electric rotating machine according to claim 1, wherein a resin included in the brush holder is disposed between the brush and the brush cooling metal member.

15. The electric rotating machine according to claim 1, wherein a member having a heat conductivity that is higher than that of the resin included in the brush holder is disposed between the brush and the brush cooling metal member.

16. The electric rotating machine according to claim 1, wherein the brush cooling metal member is disposed facing at least part of the outer circumferential surface of the brush.

17. The electric rotating machine according to claim 1, wherein the brush cooling metal member is disposed at least in the vicinity of the contact portion between the slip ring and the brush.

18. The electric rotating machine according to claim 1, wherein the brush cooling metal member is formed of a plurality of members.

19. The electric rotating machine according to claim 1, wherein the brush cooling metal member is provided with a plate, for dispersing heat, that is situated on the wall face in a space where the brush is stored, and the brush cooling metal member is disposed in such a way that part thereof is in parallel with the plate.

20. The electric rotating machine according to claim 1, wherein the brush cooling metal member is fixed to the outer side face of the brush holder after the brush holder is molded.

\* \* \* \* \*